J. C. RENNIE.
OFFSETTING DEVICE FOR SAWMILL CARRIAGES.
APPLICATION FILED SEPT. 12, 1907.

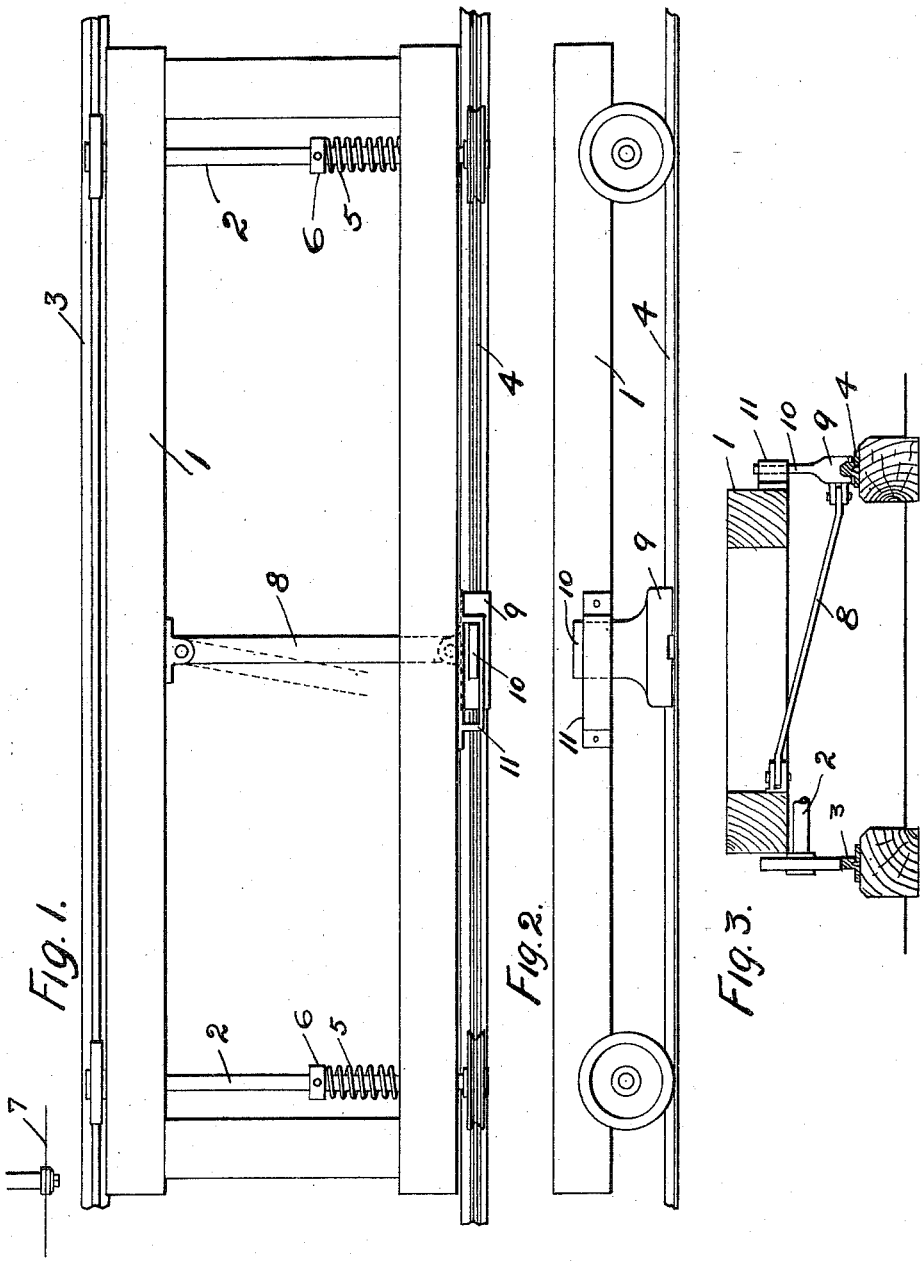

995,183.

Patented June 13, 1911.
2 SHEETS—SHEET 2.

WITNESSES:
Ella Brickell
Frank E. Dennett

John C. Rennie INVENTOR
BY
ATTORNEY

UNITED STATES PATENT OFFICE.

JOHN C. RENNIE, OF MINNEAPOLIS, MINNESOTA, ASSIGNOR TO ALLIS-CHALMERS COMPANY, OF MILWAUKEE, WISCONSIN, A CORPORATION OF NEW JERSEY.

OFFSETTING DEVICE FOR SAWMILL-CARRIAGES.

995,183. Specification of Letters Patent. Patented June 13, 1911.

Application filed September 12, 1907. Serial No. 392,446.

*To all whom it may concern:*

Be it known that I, JOHN C. RENNIE, a subject of the King of Great Britain, residing at Minneapolis, in the county of Hennepin and State of Minnesota, have invented a certain new and useful Improvement in Offsetting Devices for Sawmill-Carriages, of which the following is a specification.

This invention relates to a mechanism for offsetting a saw mill carriage during the return travel of the carriage.

The object of the invention is to provide a simple and efficient means for offsetting.

Figure 5:
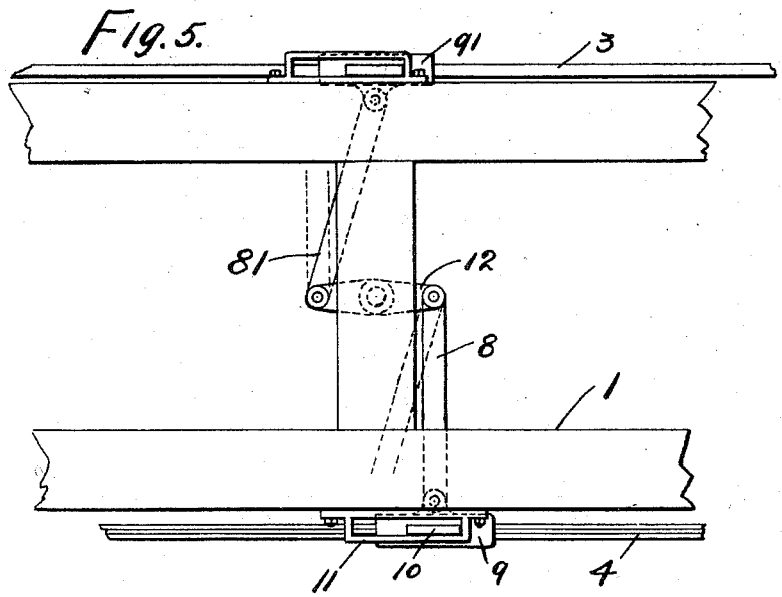
Figure 4:
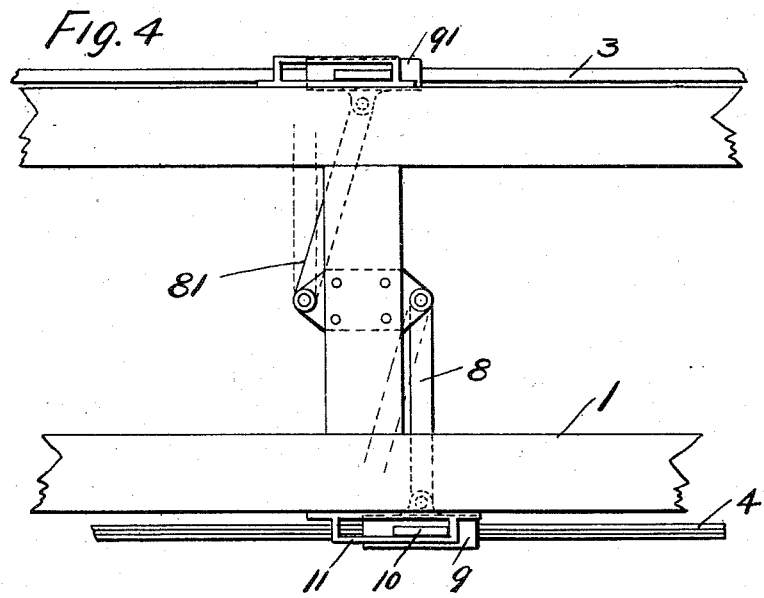

In the drawings, Figure 1 is a plan view of a saw mill carriage in outline showing its relation to the saw and in position set up to the saw and ready for "the cut", that is, in position for sawing a board from a log to be placed upon the carriage; Fig. 2 is an elevation thereof; Fig. 3 is a transverse section showing the swinging strut connection between the carriage and the friction shoe; Fig. 4 is a broken plan view of a modification in which a strut member is used in moving the carriage transversely in either direction; and Fig. 5 is a broken plan view of a modification in which the re-action of the thrust in moving the carriage transversely in either direction is taken up by both rails.

Referring to the drawings, the saw carriage 1 is mounted upon trucks 2, 2, which run upon rails 3, 4, one, 3, of which is a flat top rail, and another, 4, of which is a V-rail. This is the usual construction in saw carriage practice to prevent the trucks from running off the rails. The carriage 1 is mounted upon the trucks 2, 2, so as to have a motion thereon transverse to the rails. Springs 5, 5, are placed upon the axles of the trucks 2, 2, in such a way as to bear against collars 6, 6, fast upon the axles and with their opposite ends bearing against axle bearings, not shown, mounted underneath the carriage adjacent the V-rail. These springs 5, are arranged to tend to offset the carriage 1 away from the saw 7.

The means provided for thrusting or onsetting the carriage toward the saw and against the tension of the springs 5, is as follows: A strut 8 is pivoted at one end to the carriage 1, and at its opposite end to a shoe 9, sliding on the V-rail. The shoe 9 has an extension 10, projecting from its upper side, and this extension 10 has free play in a stop 11, mounted upon the side of the carriage 1. The stop 11 is so designed and adjusted upon the carriage that when the extension 10 of the shoe 9 is at one limit of the play within the stop, the strut 8 has a right angle position to the length of the carriage, and when the extension 10 is at the opposite limit of the play within the stop 11, the strut 8 has an oblique position with reference to the length of the carriage.

Operation: When the carriage is moved in a reverse direction to that for taking a cut, the friction of the shoe 9 upon the rail 4 will hold the shoe in position on the rail until the extension 10 upon the shoe contacts with the opposite wall within the stop 11, the strut taking an oblique position from one at right angles to the carriage length. This will allow the carriage to be offset away from the saw during the "jigging back" of the carriage. The carriage is actually offset by the power stored in the springs 5, these re-acting against the collars 6 on the truck axles and acting against the axle bearings underneath the carriage and thus offsetting the carriage. When the carriage 1 is moved in a direction to take a cut, the strut 8 will first be caused to take a perpendicular position, as shown in Fig. 1, from the oblique position there shown by reason of the friction of the shoe 9 upon the rail 4. The toggle action of the strut 8 in assuming this position will force the carriage 1 transversely of the rails toward the saw the amount of the previous offset of the carriage and in opposition to the force of the springs 5, thus storing energy in these springs for the purpose of later offsetting the carriage.

If necessary, there may be a pair of struts 8 connected by a tie-rod, so as to make these struts move in unison at equal angles to the length of the carriage. This construction may be necessary to cause the carriage to move uniformly at each end thereof and transverse of the rails.

In the modification shown in Fig. 4, a strut 8 is used as before to move the carriage transversely toward the saw in order to take a cut, while a second strut 81 is used instead of springs to offset the carriage. The action of the struts is similar to that already described. It will be necessary in this modification that there be side play between the shoes and the rails sufficient to compensate for the reverse curved paths which the points on the carriage will take at which the struts are pivoted; that is, the point to which the strut 8 is pivoted will be a path having a curvature about the point on the shoe 9 at which the strut 8 is pivoted, while the point on the carriage at which the strut 81 is pivoted will take the path having a curvature about the point on the shoe 91 at which the struct 81 is pivoted. These two paths are reverse curves, and if a single point on the carriage be assumed to take both of these paths, there will be a maximum distance between the two curves which will have to be compensated for by the clearance between the shoe and rails above referred to. In this modification it should be noted that the re-action due to offsetting or setting up to the saw comes upon either one or the other of the rails and not upon both at the same time.

In the modification shown in Fig. 5, the compensation due to reverse curvature is taken care of by pivoting the inner ends of the struts 8, 81, of the modification of Fig. 4 to the ends of a bar 12 pivoted to the carriage at its middle point. The shoes 9, 91, in this modification have no lost motion on the rails. The compensation due to reverse curvature is effected by a slight oscillation of the bar 12 upon its central pivot. Otherwise, the action is similar to the modification shown in Fig. 4. It should be noted that in the modification shown in Fig. 5, the re-action of offsetting and setting up to the saw is taken up by both rails at the same time, and the re-active pressure is divided equally between these two rails. One of the struts however is placed under tension.

It is to be understood that it is not desired to be limited to the exact details of construction shown and described, for obvious modifications will occur to a person skilled in the art.

Having described the invention, what is claimed and desired to secure by Letters Patent, is:

The combination of a carriage, a truck for the carriage, rails for the truck, a bar pivoted on said carriage, and links or struts pivoted to said bar and coacting against said rails at points substantially opposite each other.

In testimony whereof, I affix my signature in the presence of two witnesses.

JOHN C. RENNIE.

Witnesses:
H. C. CASE,
G. F. DE WEIN.

Copies of this patent may be obtained for five cents each, by addressing the "Commissioner of Patents, Washington, D. C."